US007849898B2

(12) United States Patent
Gunther et al.

(10) Patent No.: US 7,849,898 B2
(45) Date of Patent: Dec. 14, 2010

(54) APPARATUS FOR REORIENTING INLAYS

(75) Inventors: William G. Gunther, Guilford, CT (US); Roman Golicz, Clinton, CT (US); Stefan G. Golicz, Saybrook, CT (US)

(73) Assignee: George Schmitt & Company, Inc., Guilford, CT (US)

( * ) Notice: Subject to any disclaimer, the term of this patent is extended or adjusted under 35 U.S.C. 154(b) by 458 days.

(21) Appl. No.: 11/948,215

(22) Filed: Nov. 30, 2007

(65) Prior Publication Data

US 2008/0128090 A1 Jun. 5, 2008

Related U.S. Application Data

(60) Provisional application No. 60/868,001, filed on Nov. 30, 2006.

(51) Int. Cl.
*B32B 41/00* (2006.01)

(52) U.S. Cl. ....................... 156/361; 156/364; 156/363; 156/362

(58) Field of Classification Search ................. 156/361, 156/362, 363, 364, 366, 367, 536, 558
See application file for complete search history.

(56) References Cited

U.S. PATENT DOCUMENTS 3,574,026 A 4/1971 Kucheck
4,390,390 A 6/1983 Margraf et al. .............. 156/566
4,475,969 A * 10/1984 Reed .......................... 156/152
4,612,079 A 9/1986 Ostrow
4,861,406 A 8/1989 Baker et al.
5,421,946 A * 6/1995 Flaig .......................... 156/361
5,650,730 A * 7/1997 Herbst, Jr. ................... 324/690
5,733,410 A * 3/1998 Gore et al. .................. 156/556
6,357,503 B1 * 3/2002 Kromer et al. .............. 156/351
6,412,535 B1 * 7/2002 Barilovits et al. ........... 156/362
2003/0063139 A1 * 4/2003 Hohberger et al. ............. 347/2
2004/0206461 A1 * 10/2004 Poole et al. ................. 156/541

OTHER PUBLICATIONS

International Search Report, May 15, 2008, 2 Pages.

* cited by examiner

*Primary Examiner*—George R Koch, III
(74) *Attorney, Agent, or Firm*—St. Onge Steward Johnston & Reens LLC

(57) ABSTRACT

An apparatus for reorienting liner-borne inlays is provided. Such apparatus utilize electronic control devices to precisely move inlays from a first orientation and spacing to a second orientation and spacing. Embodiments of the present invention include a vacuum manifold having an elongated ridge member so that the apparatus are useful in handling thin and flexible inlays and minimize errors in inlay reorientation.

17 Claims, 4 Drawing Sheets

APPARATUS FOR REORIENTING INLAYS

CROSS-REFERENCE TO RELATED APPLICATIONS

The present application claims the benefit of priority under 35 U.S.C. §119(e) to U.S. Provisional Application No. 60/868,001 filed on Nov. 30, 2006, entitled "Apparatus and Method for Reorienting Inlays," the entirety of which is incorporated by reference herein.

FIELD OF THE INVENTION

The invention disclosed herein contemplates an apparatus for transferring and reorienting a series of inlays on a liner from a first orientation and spacing to a second orientation and spacing.

BACKGROUND OF THE INVENTION

In the field of processing inlays, the inlays are often manufactured in series. The inlays generally are formed of paper, plastic, or the like, with one side comprising the inlay and the other side suitable for affixation to the surface of an object. Affixation is generally accomplished by means of an adhesive. Most commonly, a pressure sensitive adhesive is used on the side of the inlay suitable for affixation. For processing, the inlays are temporarily fixed to a long, flexible liner that can be rolled and unrolled easily. The liner is commonly composed of a paper layer which is silicone coated and referred to as the release layer. The inlays are generally placed on the release layer of the liner and temporarily fixed by their pressure sensitive adhesive.

It is often the case that one machine will be used to manufacture the inlays, apply them to the liner and then roll-up the liner for application of the inlays by a second machine. Each inlay is generally applied to one of a series of identical objects, such as labels, bottles, or other containers. However, it is often the case that an inlay orientation different than that resulting from the manufacturing process is optimal for placement on an object, such as a label. The manufacturer of the inlay has placed the inlay on the liner in the orientation that is best suited to the manufacturer. Because of the design of the label or any of the label's geometric characteristics, the orientation of the inlay may need to be rotated in order to fit the label.

Briefly stated, the orientation of the inlays on the liner that is most suitable for manufacturing the inlays is often not the most suitable orientation for applying or affixing the inlays to the objects. It is often desirable, therefore, to change the orientation of the inlays, for example by 90 degrees, on a liner after they have been manufactured in order to more efficiently apply them to the objects.

U.S. Pat. No. 4,475,969 to Reed discloses methods of transferring inlays from one liner to another liner and to a second orientation from a first orientation on a single liner. Inlays made from paper stock with adhesive on one side are lifted from a liner by a peel member and redeposited on a liner disposed perpendicular or parallel to the first liner. Air jets from a manifold are used to support the inlay as it is pulled from the liner and repositioned. The Reed patent also shows inlays being repositioned by a 90° rotation on a single liner. A hammer, roll, or air blast is used to firmly fix the inlay in its new position.

Unfortunately, the methods and systems disclosed in the Reed patent suffer from significant drawbacks. First, the systems do not work well with inlays that are thin and/or flexible.

Such inlays have a tendency to curl or buckle after being removed from a liner, unless support is provided for the inlay. The one dimensional manifold will not prevent a flexible inlay from curling or buckling after it is removed from the liner. Second, the purely mechanical repositioning system is prone to inlay positioning error. For example, when transferring inlays from one liner to a second liner, it is difficult to maintain a constant spacing because the machines that advance the liners may not maintain a constant speed as the liner rolls are advanced. Furthermore, the purely mechanical repositioning system makes it inconvenient to set and adjust the spacing between re-positioned labels.

What is needed, therefore, is an apparatus for transferring and reorienting inlays on a liner that is useful with inlays of all types, even those that are extremely thin and/or flexible, that minimizes the errors in positioning the inlays on a liner by providing precise control over the depositing of the inlays on the liner, and that allows for easy and convenient control over the spacing of the inlays.

SUMMARY OF THE INVENTION

It is an object of the present invention to provide an apparatus for automatically reorienting inlays from a first orientation on a liner to a second orientation on a liner.

It is another object of the present invention to provide an apparatus for reorienting inlays that minimizes errors in positioning inlays on a liner.

It is a further object of the present invention to provide an apparatus for reorienting inlays that provides precise control of the orientation and spacing of inlays on a liner.

It is still a further object of the present invention to provide an apparatus for reorienting inlays that is useful for reorienting thin and/or flexible inlays.

These and other objects are achieved, in accordance with one embodiment of the present invention, by the provision of an apparatus for reorienting inlays, comprising: a liner unwinding device for advancing a first section of liner including a plurality of inlays disposed in a first orientation thereon, a peeling device for separating the inlays from the first section of liner, a vacuum manifold for retaining one of the inlays after separation from the first section of liner and for depositing the separated inlay on a second section of liner in a second orientation that is different than the first orientation, and at least one electronic control device. The first section of liner is advanced by the liner unwinding device over the peeling device. The electronic control device controls the speed and degree of advance of a liner via the liner unwinding device and controls the depositing of inlays by the vacuum manifold.

In some embodiments, an electronic sensor is in communication with the at least one electronic control device, and the electronic sensor senses the advance of the first section of liner by the liner unwinding device. In some embodiments, an electronic sensor is in communication with the at least one electronic control device, and the electronic sensor senses the presence of a separated inlay retained on the vacuum manifold. In some embodiments, the first section of liner is part of a first liner and the second section of liner is part of a second liner. In some embodiments, the apparatus further comprises a second liner unwinding device for advancing a second liner, the second liner is arranged at an angle with respect to the first liner. In some embodiments, the at least one electronic control device further controls the speed and degree of advance of the second section of liner via the second liner unwinding device relative to the speed and degree of advance of the first section of liner and relative to the depositing of inlays by the vacuum manifold. In some embodiments, the vacuum manifold comprises a lower surface comprising at least one elongated ridge member and a plurality of openings for providing a vacuum adjacent to the lower surface.

According to a second embodiment of the present invention, an apparatus for reorienting inlays is provided, comprising: a liner unwinding device for advancing a first section of liner including a plurality of inlays disposed in a first orientation thereon, a peeling device for separating the inlays from the first section of liner, and a vacuum manifold in fluid communication with an air pump. The first section of liner is advanced by the liner unwinding device over the peeling device. The vacuum manifold comprises a lower surface comprising at least one elongated ridge member and a plurality of openings for creating at least a partial vacuum adjacent to the lower surface. The vacuum manifold retains one of the inlays after separation from the first section of liner using a vacuum pressure and deposits the separated inlay on a liner in a second orientation that is different than the first orientation by releasing the vacuum pressure.

In some embodiments, the first section of liner is part of a first liner and the second section of liner is part of a second liner. In some embodiments, the elongated ridge member comprises a monofilament bonded to the lower surface. In some embodiments, the vacuum manifold further comprises an electronic sensor for sensing the presence of an inlay on the lower surface. In some embodiments, the electronic sensor is at least one of an optical sensor, a capacitive sensor, and a magnetic sensor.

According to a third embodiment of the present invention, an apparatus for reorienting inlays is provided, comprising: a first liner unwinding device for advancing a first liner, a second liner unwinding device for advancing a second liner, a peeling device for separating the inlays from the first liner, a vacuum manifold in fluid communication with an air pump for retaining one of the inlays after separation from the first liner by a vacuum pressure and for depositing the separated inlay in a second orientation that is different than the first orientation onto the second liner by releasing the vacuum pressure, and at least one electronic control device for controlling the advance of the first liner via the first liner unwinding device, the depositing of inlays by the vacuum manifold, and the advance of the second liner via the second liner unwinding device. The first liner includes a plurality of inlays disposed in a first orientation thereon. The second liner is arranged at a 90° angle with respect to the first liner. The first liner is advanced by the first liner unwinding device over the peeling device.

In some embodiments, the vacuum manifold comprises a lower surface comprising a plurality of openings for providing a vacuum adjacent to the lower surface and at least one elongated ridge member. In some embodiments, the elongated ridge member comprises a monofilament bonded to the lower surface. In some embodiments, the apparatus further comprises a first electronic sensor and a second electronic sensor in communication with the at least one electronic control device, and the first electronic sensor senses the advance of the first liner by the first liner unwinding device while the second electronic sensor senses the advance of the second liner by the second liner unwinding device. In some embodiments, the apparatus further comprises an electronic sensor in communication with the at least one electronic control device, wherein the electronic sensor senses the presence of a separated inlay retained on the vacuum manifold.

Thus embodiments of the present invention provide an apparatus for automatically reorienting inlays from a first orientation on a liner to a second orientation on a liner. In some embodiments, the inlays are transferred from a first liner to a second liner, while in other embodiments, the inlays are reoriented on a single liner. Apparatus according to the present invention minimize errors in positioning inlays on a liner and are useful for reorienting thin and/or flexible inlays by the use of an elongated ridge member on a vacuum manifold for depositing inlays. Apparatus according to the present invention provide precise control of the reorientation of inlays on a liner by using electronic control devices for controlling the advance of one or more liners and for controlling a vacuum manifold device for depositing the inlays.

These and other objects and advantages of the present invention will be apparent from the following description, the accompanying drawings, and the appended claims.

DETAILED DESCRIPTION OF THE DRAWINGS

Figure 1:
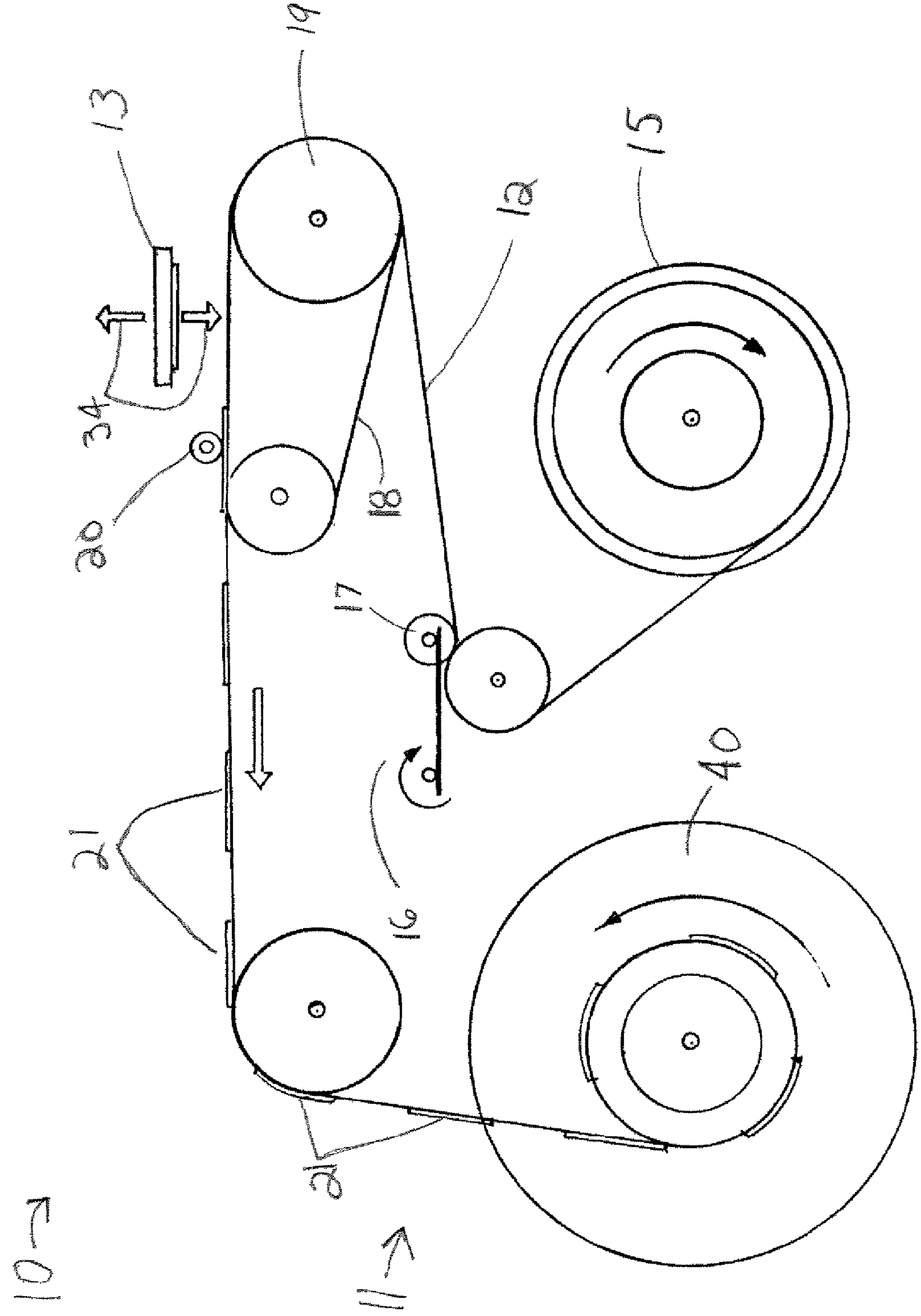
FIG. 1 shows a schematic view of parts of an apparatus for reorienting inlays according to an embodiment of the present invention.

The present invention will now be described with reference to the accompanying drawings. FIG. 1 shows a schematic view of parts of an apparatus 10 for reorienting inlays according to an embodiment of the present invention. FIG. 1 shows, schematically, a liner unwinding device 11, which serves the purpose of providing and advancing a web or liner 12 onto which inlays are deposited by the vacuum manifold 13. The liner unwinding device 11 includes a liner unwind module 15, on which a roll of liner 12 is mounted for unwinding. The liner 12 is most commonly made of paper with one side being silicone coated to receive pressure-sensitive inlays. Other liner configurations and types are used in other embodiments, for example, flexible plastic liners with silicone coating are used.

The liner 12 is pulled through the liner guide/shock absorber 16, which has an arm-mounted roller weight 17 for adjusting the tension in the liner 12. The shock absorber 16 is used to maintain the proper tension in the liner 12, to prevent the liner 12 from having too much slack or too little slack. The shock absorber 16 helps to prevent breakage of the liner 12 as it is being advanced by the liner unwinding device 11.

A semi-conductive belt 18 is driven by the indexer 19. The indexer 19 is driven by at least one servo in a manner described below. The semi-conductive belt 18 contacts the underside of the liner 12 and pulls it from the unwind module 15. The vacuum manifold 13 deposits inlays on the liner 12 one at a time, in a manner also described below. An inlay applicator roller 20 is provided for applying a downward pressure on an inlay after it is affixed to the liner 12 to ensure that the inlay is fully adhered to the liner 12. Finally, the liner unwinding device 11 includes a rewind module 40, which winds the liner 12 after the inlays 21 have been deposited thereon. The inlays 21 may be constructed using paper, plastic, or any other suitable material for inlays or labels. The inlays 21 generally utilize pressure-sensitive adhesion on the portion of the inlay that contacts the liner, but the inlays may be of various other types known to those of skill in the art.

Figure 2:
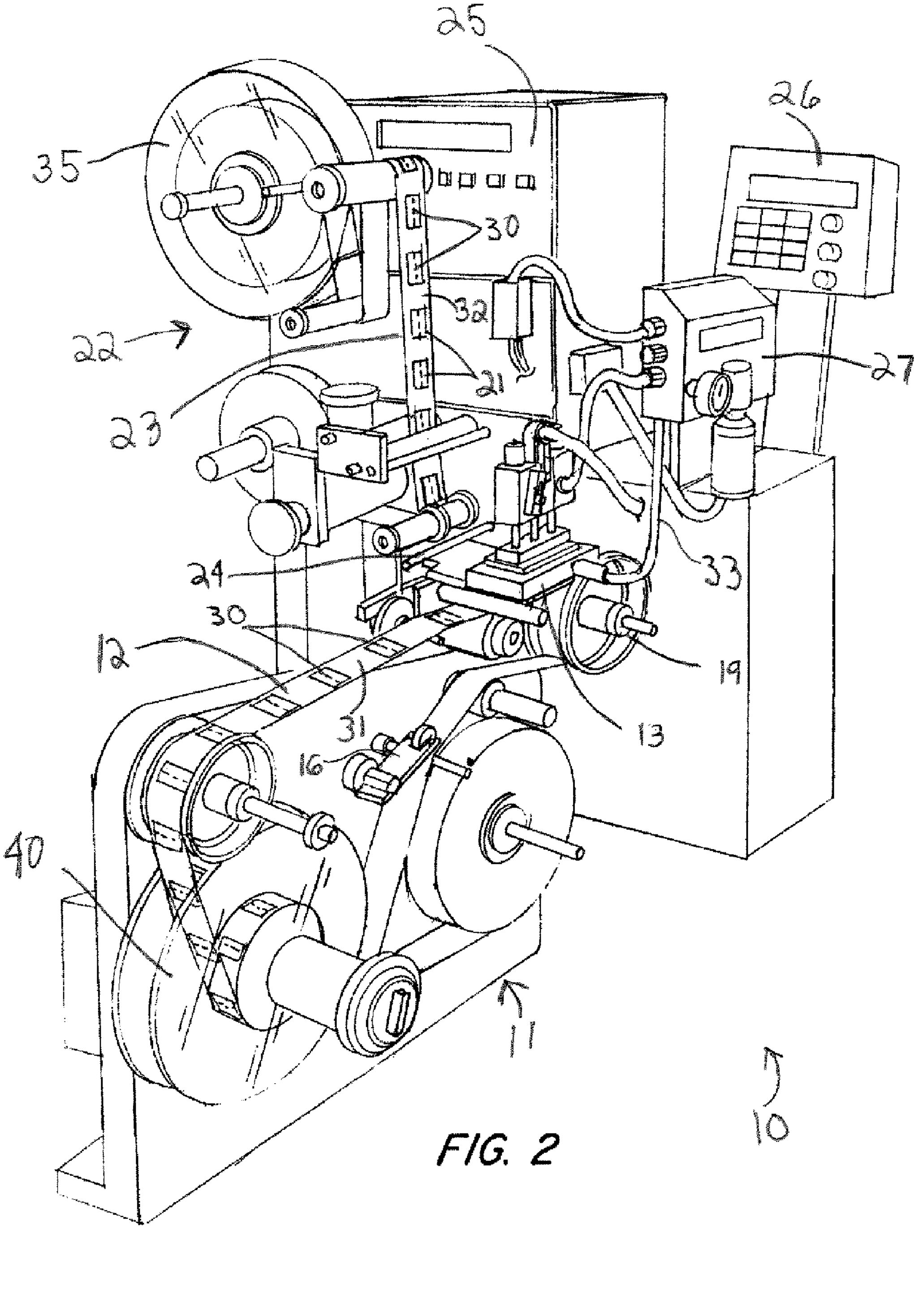
FIG. 2 shows an isometric view of the apparatus for reorienting inlays shown in FIG. 1.

FIG. 2 shows an isometric view of an apparatus 10 for reorienting inlays. The apparatus 10 includes a first liner unwinding device 22 and a second liner unwinding device 11. In FIG. 2, the second liner unwinding device 11 is substantially similar to the liner unwinding device described above with reference to FIG. 1. The two liner unwinding devices are arranged such that the liners on each device are perpendicular to one another. That is, the long dimensions of the liners are at a 90° angle with respect to one another. The first liner unwinding device 22 provides and advances first liner 23, which is provided on a roll on the unwind module 35. As shown in the figure, the first liner 23 has inlays 21 in a first orientation adhered to a surface thereof. The second liner unwinding device 11 includes the second liner 12 on which the inlays 21 are deposited. The arrangement of the first and second liner unwinding devices 22 and 11 allow the inlays to be placed on the second liner 12 in an orientation that is rotated 90° relative to the long dimension of the liner from the original orientation of the inlays on the first liner 23.

Figure 3:
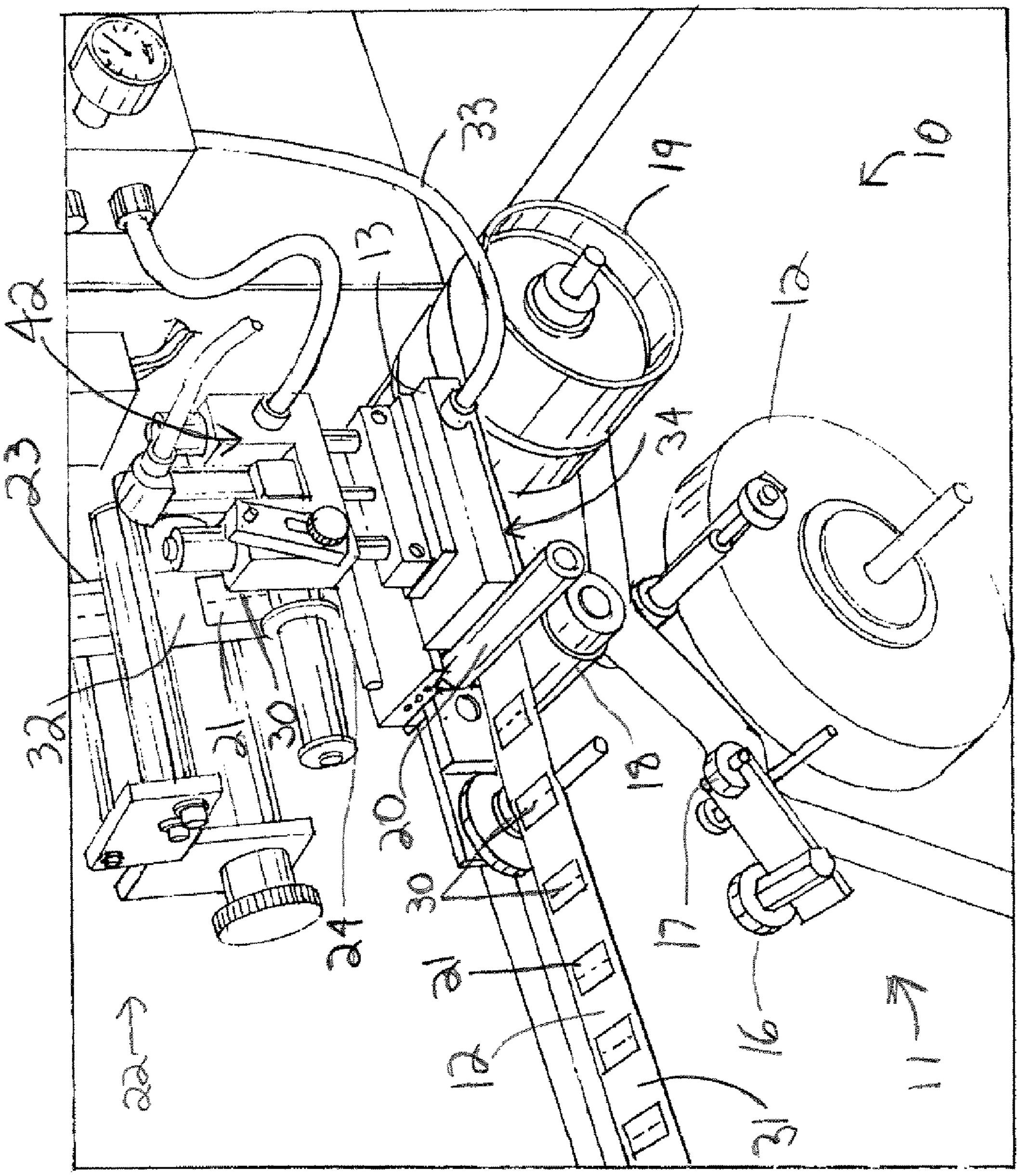
FIG. 3 shows a close-up, isometric view of the inlay separation and reorientation portion of the apparatus for reorienting inlays shown in FIG. 1.

FIGS. 2 and 3 illustrate this aspect of the apparatus 10. The inlays 21 on the first liner 23 have a first orientation, illustrated by the dotted line 30 on each inlay 21 that is parallel to the long dimension of the first liner 23. After reorientation, the inlays 21 are shown affixed to second liner 12 with the dotted lines 30 oriented perpendicular to the long dimension of the second liner 12. The inlays 21 also have a different spacing 31 after affixation to the second liner 12 than their spacing 32 on first liner 23.

The apparatus 10 also includes the necessary components for separating the inlays from the first liner 23 and depositing them on the second liner 12. These components, which will be described in more detail below, include the vacuum manifold 13 and a peel plate or member 24, among others. Electronic control devices 25, 26, and 27 are also part of the apparatus 10. The electronic control device 25 controls the advance of the first liner 23 on the first liner unwinding device 22. The electronic control device 26 controls the advance of the second liner 12 on the second liner unwinding device 11. The electronic control device 27 controls the vacuum manifold 13.

The electronic control devices 25, 26, and 27 work in tandem to ensure that the inlays are deposited on the second liner 12 in a precise manner from the first liner 23. In most embodiments of the present invention, the electronic devices are coupled to and communicate with one another. In other embodiments of the invention, a single electronic control device is provided and it controls all the functions of the apparatus 10. The electronic control devices 25 and 26, in some embodiments, control the relative speeds of the first and second liner unwinding devices, and therefore the advance of the first and second liners, to select the spacing between the inlays. In the embodiment shown, the second liner unwinding device 11 advances the liner 12 using the rotation of the indexer 19, and in some embodiments, also the rewind module 40. Both are driven by servos that are accurately controlled by the electronic control 26 to ensure the smooth advance of the liner 12. Substantially similar means are utilized to drive the first liner unwinding device 22. In some embodiments, the liner unwinding devices 22 and 11 advance the first and second liners simultaneously and, when possible, at a continuous rate. In other embodiments, the liner unwinding devices 22 and 11 advance the first and second liners as necessary, stopping and starting when appropriate to ensure precise location of the inlays 21 on the second liner.

In some embodiments, the electronic control devices 25 and 26 are in communication with sensors that sense the advance of the first and second liners 23 and 12. In general, both the first and second liners 23 and 12 are each monitored by an individual sensor. The sensors communicate to the control devices 25 and 26 the distance that the liners have traveled and the control devices 25 and 26 issue the appropriate commands to the first and second liner unwinding devices 22 and 11. Such sensors are optical in some embodiments, and may be aided by appropriate markings on the first and second liners. Sensors of other types known to those of ordinary skill in the art are used in other embodiments of the present invention. Other functions of the apparatus 10 are controlled and monitored by electronic control devices as is necessary or advantageous.

The electronic control device 27 is used to control the function of the vacuum manifold 13. In preferred embodiments, the vacuum manifold 13 utilizes vacuum pressure to retain an inlay that is removed or peeled from the first liner 23. As shown in both FIGS. 2 and 3, the vacuum manifold 13 has an air tube 33, which is connected to an air pump and pressure modulator. The air pump and pressure modulator are integral with the electronic control device 27 in the embodiment shown, but are separate, interconnected parts in other embodiments. The electronic control device 27 controls the vacuum/air pressure supplied to the vacuum manifold, which pressure is transmitted to the outside of the vacuum manifold by holes on the lower surface 34 of the vacuum manifold 13. The details of an embodiment of the vacuum manifold will be described in detail with respect to FIGS. 4 and 5.

The electronic control device 27 also controls the movement of the vacuum manifold 13. In the embodiment shown, the vacuum manifold 13 is capable of vertical movement to place an inlay retained on its lower surface onto the second liner 12. Such vertical movement is accomplished by pneumatics, electric servos, and similar means and the movement is indicated by arrows 34 in FIG. 1. A system for providing vertical movement of the vacuum manifold 13 is indicated generally by reference character 42 in FIG. 3. The system 42 moves the manifold 13 up and down in response to commands from electronic control device 27.

To ensure that the inlays 21 are placed at the selected intervals on the second liner 12 and to avoid fouling the series of inlays 21 by an incorrectly oriented inlay, the vacuum manifold 13 is provided with a sensor for sensing the presence of an inlay 21 on its lower surface 34 in some embodiments. The sensor is in communication with the electronic control device 27, and is used to sense not only the presence of the inlay on the lower surface 34, but also that it is in the proper orientation. Suitable sensor types include capacitive sensors, magnetic sensors, optical sensors, and the like.

FIG. 3 is a close-up isometric view of the vacuum manifold 13 and other components associated with separating the inlays 21 from the first liner 23 and depositing them on the second liner 12. FIG. 3 shows the shock absorber 16 with the roller weight 17 applying tension to the second liner 12. The indexer 19 and the semi-conductive belt 18 are also shown as parts of the liner unwinding device 11. The peel plate/member 24 is also shown. The peel plate/member 24 is designed according to principles that are well known in the art and exemplified by the peel member shown in the figures of U.S. Pat. No. 4,475,969 to Reed. Any peel member design that is capable of consistently and efficiently removing an inlay from the first liner may be employed in embodiments of the present invention.

The apparatus 10 operates as follows. The electronic control device 25 directs the first liner unwinding device 22 to advance the liner 23, which bears the inlays 21 in a first orientation and spacing. The liner 23 is advanced to the peel plate/member 24 so that each inlay 21 is separated from the liner 23 one by one. After an inlay has been separated from the first liner 23 by the peel member 24, it is retained by a lower surface 34 of the vacuum manifold 13 by a vacuum pressure. The inlay's pressure sensitive adhesive is now exposed and facing downward. The second liner 12 is advanced by the second liner unwinding device 11 under the control of the electronic control device 26 and the second liner 12 moves underneath the vacuum manifold 13. The vacuum manifold 13, when directed by the electronic control device 27, lowers the inlay 21 retained on its lower surface 34 until the pressure sensitive adhesive of the inlay 21 makes contact with the second liner 12. Simultaneously, the vacuum pressure created in the vacuum manifold 13 is released by the electronic control device 27 to allow the inlay 21 to be easily removed from the lower surface 34. In some embodiments, the vacuum manifold 13 not only releases the vacuum pressure, but also creates a positive air pressure to "blow" or push the inlay away from the lower surface 34. This ensures that the inlay 21 will not get hung up on the lower surface 34 of the vacuum manifold 13 and will be placed on the second liner 12 in the proper orientation. After placement of the inlay 21 on the second liner 12, the inlay 21 is pressed to the liner by the inlay applicator roller 20. The second liner 12 is then advanced a selected amount for receiving the next inlay 21 from the vacuum manifold 13 and the first liner 12 is advanced a selected amount to separate the next inlay 21 and put the inlay in position on the vacuum manifold. The second liner 12, which now bears the inlays 21 in a second orientation and spacing, is rewound into a roll.

In an embodiment not shown in the drawings, an apparatus according to the present invention removes inlays in a first orientation from one liner and deposits them on the same liner in a second orientation. This is achieved by removing the inlays from the liner as the liner runs along a first direction, re-routing the liner to run along a second direction that is 90° with respect to the first direction, and then reapplying the inlays to the liner in its second direction. Such an arrangement for the liner is shown and described in U.S. Pat. No. 4,475,969 to Reed, specifically FIG. 2 and the associated description. This or a similar liner arrangement is employed in embodiments of the present invention and provides advantages in certain situations. The full disclosure of U.S. Pat. No. 4,475,969 to Reed is hereby incorporated by reference herein.

Figure 4:
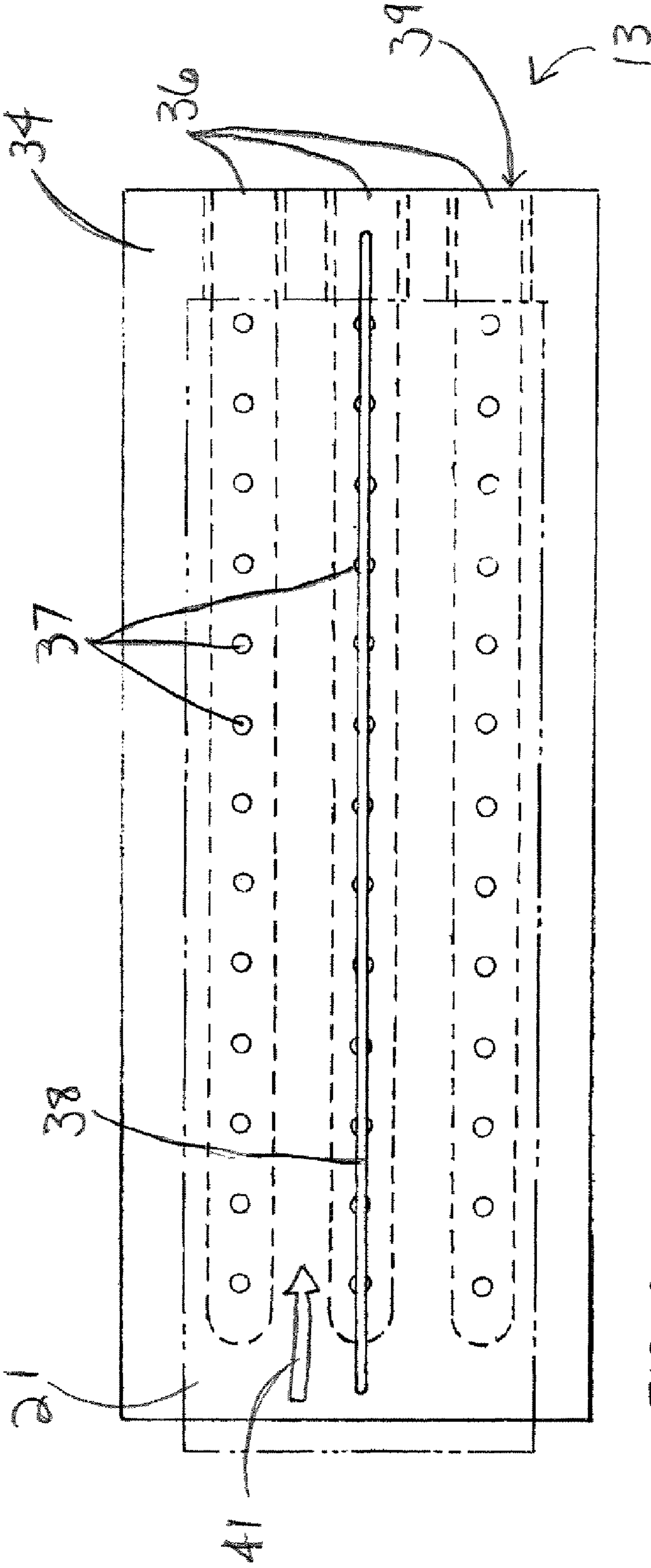
FIG. 4 is a bottom view of the vacuum manifold used for inlay separation and reorientation in the apparatus for reorienting inlays shown in FIG. 1.

FIG. 4 is a bottom view of the vacuum manifold 13, showing the lower surface 34. A rectangular inlay 21 is indicated by a dotted line. The inlay 21 is received on the lower surface 34 from the peeling plate/member 24 and moves onto the lower surface 34 in the direction of the arrow 41. The arrow 41 also corresponds to the direction of movement of the first liner 23. The vacuum manifold 13 has channels 36 that run along the length of the manifold. The channels 36 are in fluid communication with an air pump and pressure modulator via, for example, an air tube (not shown in FIG. 4). The vacuum manifold 13 has a plurality of holes 37 that transmit the air pressure (whether vacuum or positive air pressure) to the area adjacent to the lower surface 34. Thus, the inlay 21 slides into contact with the vacuum manifold 13 and is sucked against the lower surface 34 by a vacuum pressure and thereby retained by the manifold 13. When it is appropriate to deposit the inlay 21 on the second liner, the vacuum pressure is removed and, in some embodiments, a positive air pressure is provided in the channels 36 to blow or push the inlay away from the lower surface 34.

The vacuum manifold 13 is often constructed from suitable metals using one of the many techniques known to those of skill in the art of metalworking. For example, an advantageous embodiment of the vacuum manifold 13 is formed of aluminum and is CNC machined to produce the desired shape and features.

Figure 5:
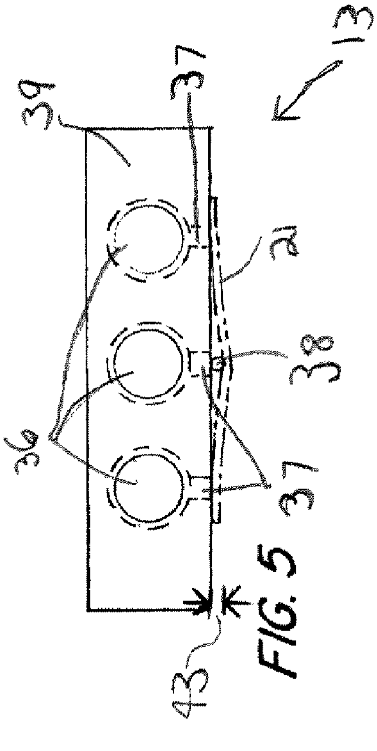
FIG. 5 is an end view of the vacuum manifold used for inlay separation and reorientation in the apparatus for reorienting inlays shown in FIG. 1.

FIG. 5 is an end view of the vacuum manifold 13, showing the end surface 39. The openings of the channels 36 are shown, as well as the outlines of the holes 37 that connect the channels 36 to the lower surface 34. Inlay 21 is again shown by a dotted line.

Both FIGS. 4 and 5 also show an elongated ridge member 38, which is bonded or formed on the lower surface 34 of the vacuum manifold 13. The ridge member 38 is disposed substantially in the center of the lower surface 34 along its length. In the embodiment shown in FIGS. 4 and 5, the ridge member 38 is a monofilament having a round cross-section that has been bonded to the lower surface 34. Such a monofilament is formed of any suitable material, including synthetic materials like rigid plastics and metals. The monofilament is bonded to the lower surface 34 by a suitable adhesive, welding technique, or the like. In the embodiment shown, the ridge member 38 is disposed directly on a central row of holes 37, but in other embodiments is disposed slightly off-center to prevent any interference with the air flow through the central row of holes 37. In some embodiments, the ridge member 38 is not constructed using a separate piece such as a monofilament, but is an integral feature of the manifold 13. In such embodiments, the configuration of holes 37 is different than that shown in FIG. 4 and may include four or more rows of holes 37.

The ridge member 38 improves the performance of the system when thin and/or flexible inlays 21 are used. Thin and/or flexible inlays 21 often lack sufficient structural strength to maintain a smooth and uniform presence on the lower surface 34. For example, extremely thin inlays are often also flexible (such inlays may be used to label flexible surfaces such as plastic bags and the like) and have a tendency to buckle or skew as the inlays are slid across the lower surface 34. Buckling produces folds in the inlay which are nearly impossible to remove quickly due to the pressure sensitive adhesive on the inlay. Once an inlay 21 becomes buckled or skewed it will be almost certainly misplaced on the second liner 12 and could foul the second liner unwinding device 11.

The ridge member 38 helps to prevent buckling and skewing of flexible and/or thin inlays by providing a "beam" strength to the inlay. Essentially, as a result of the ridge member 38, the inlay is curved slightly across its short dimension. The slight curve given to the inlay 21 is shown in FIG. 5, and is generally uniform along the length of the inlay 21. This slight curve provides the "beam" strength and helps prevent the inlay from bending, folding, or "buckling" along its length.

Further, the ridge member 38 helps ensure that the inlay is properly deposited on the second liner 12. When the vacuum manifold 13 is lowered, the inlay 21 contacts the liner first along the ridge member 38. Because the second liner 12 is supported by the semi-conducting belt 18 (as shown in FIGS. 1, 2, and 3), the second liner 12 will conform to the "beam"-strengthened shape of the liner 21 created by the ridge member 38 and assures proper adhesion as the vacuum pressure is converted to positive pressure to blow the inlay 21 away from the lower surface 34.

The height of the ridge member 38, indicated by reference character 43 in FIG. 5, determines the degree of curvature that the inlays 21 will be subjected to. The height 43 can be varied according to the types of inlays that are anticipated to be used with the apparatus 10.

Thus, the present invention provides a novel and efficient solution to the problems with inlay reorientation described above. Apparatus according to the present invention minimize errors in positioning inlays on a liner and are useful for reorienting thin and/or flexible inlays by the use of an elongated ridge member on a vacuum manifold for depositing inlays. Apparatus according to the present invention provide precise control of the reorientation of inlays on a liner by using electronic control devices for controlling the advance of one or more liners and for controlling a vacuum manifold device for depositing the inlays.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for reorienting inlays, comprising:

a liner unwinding device for advancing a first section of liner including a plurality of inlays disposed in a first orientation thereon;

a peeling device for separating the inlays from the first section of liner, over which the first section of liner is advanced by the liner unwinding device;

a vacuum manifold for retaining one of the inlays after separation from the first section of liner and for depositing the separated inlay on a second section of liner in a second orientation that is different than the first orientation; and at least one electronic control device which controls the speed and degree of advance of the first section of liner via the liner unwinding device and which controls the depositing of inlays by the vacuum manifold;

wherein said at least one electronic control device causes the apparatus to maintain a constant spacing between each of the inlays on the second section of liner, and allows for said constant spacing to be set and adjusted.

2. The apparatus of claim 1, further comprising an electronic sensor in communication with the at least one electronic control device, wherein the electronic sensor senses the advance of the first section of liner by the liner unwinding device.

3. The apparatus of claim 1, further comprising an electronic sensor in communication with the at least one electronic control device, wherein the electronic sensor senses the presence of a separated inlay retained on the vacuum manifold.

4. The apparatus of claim 1, wherein the first section of liner is part of a first liner and the second section of liner is part of a second liner.

5. The apparatus of claim 4, further comprising a second liner unwinding device for advancing the second section of liner, wherein the second section of liner is arranged at an angle with respect to the first section of liner.

6. The apparatus of claim 5, wherein the at least one electronic control device further controls the speed and degree of advance of the second section of liner via the second liner unwinding device relative to the speed and degree of advance of the first section of liner and relative to the depositing of inlays by the vacuum manifold.

7. The apparatus of claim 1, wherein the vacuum manifold comprises a lower surface comprising at least one elongated ridge member and a plurality of openings for providing a vacuum adjacent to the lower surface.

8. An apparatus for reorienting inlays, comprising:

a liner unwinding device for advancing a first section of liner including a plurality of inlays disposed in a first orientation thereon;

a peeling device for separating the inlays from the first section of liner, over which the first section of liner is advanced by the liner unwinding device; a vacuum manifold in fluid communication with an air pump, comprising a lower surface comprising at least one elongated ridge member and a plurality of openings for creating at least a partial vacuum adjacent to the lower surface;

wherein the vacuum manifold retains one of the inlays after separation from the first section of liner using a vacuum pressure and deposits the separated inlay on a second section of liner in a second orientation that is different than the first orientation by releasing the vacuum pressure; and at least one electronic control device which controls the speed and degree of advance of the first section of liner via the liner unwinding device and which controls the depositing of inlay by the vacuum manifold;

wherein said at least one electronic control device causes the apparatus to maintain a constant spacing between each of the inlays on the second section of liner, and allows for said constant spacing to be set and adjusted.

9. The apparatus of claim 8, wherein the first section of liner is part of a first liner and the second section of liner is part of a second liner.

10. The apparatus of claim 8, wherein the elongated ridge member comprises a monofilament bonded to the lower surface.

11. The apparatus of claim 8, wherein the vacuum manifold further comprises an electronic sensor for sensing the presence of an inlay on the lower surface.

12. The apparatus of claim 11, wherein the electronic sensor is at least one of an optical sensor, a capacitive sensor, and a magnetic sensor.

13. An apparatus for reorienting inlays, comprising:

a first liner unwinding device for advancing a first liner, the first liner including a plurality of inlays disposed in a first orientation thereon;

a second liner unwinding device for advancing a second liner, wherein the second liner is arranged at a 90° angle with respect to the first liner;

a peeling device for separating the inlays from the first liner, over which the first liner is advanced by the first liner unwinding device;

a vacuum manifold in fluid communication with an air pump for retaining one of the inlays after separation from the first liner by a vacuum pressure and for depositing the separated inlay in a second orientation that is different than the first orientation onto the second liner by releasing the vacuum pressure; and at least one electronic control device which controls the advance of the first liner via the first liner unwinding device, which controls the depositing of inlays by the vacuum manifold, and which controls the advance of the second liner via the second liner unwinding device;

wherein said at least one electronic control device causes the apparatus to maintain a constant spacing between each of the inlays on the second section of liner, and allows for said constant spacing to be set and adjusted.

14. The apparatus of claim 13, wherein the vacuum manifold comprises a lower surface comprising at least one elongated ridge member and a plurality of openings for providing a vacuum adjacent to the lower surface.

15. The apparatus of claim 14, wherein the elongated ridge member comprises a monofilament bonded to the lower surface.

16. The apparatus of claim 13, further comprising a first electronic sensor and a second electronic sensor in communication with the at least one electronic control device, wherein the first electronic sensor senses the advance of the first liner by the first liner unwinding device and the second electronic sensor senses the advance of the second liner by the second liner unwinding device.

17. The apparatus of claim 13, further comprising an electronic sensor in communication with the at least one electronic control device, wherein the electronic sensor senses the presence of a separated inlay retained on the vacuum manifold.

* * * * *